United States Patent [19]
Kaltenbach

[11] Patent Number: 5,996,389
[45] Date of Patent: Dec. 7, 1999

[54] MACHINING CENTER FOR PROCESSING FLAT WORKPIECES WITH A SEGMENT DISTRIBUTED HOLD-DOWN

[75] Inventor: Hermann Kaltenbach, Gundelfingen, Germany

[73] Assignee: EHT Werkzeugmaschinen GmbH, Teningen, Germany

[21] Appl. No.: 09/261,336

[22] Filed: Mar. 3, 1999

Related U.S. Application Data

[63] Continuation of application No. PCT/EP97/04006, Jul. 24, 1997.

[30] Foreign Application Priority Data

Sep. 7, 1996 [DE] Germany .................... 196 36 463

[51] Int. Cl.⁶ ........................................... B21D 5/04
[52] U.S. Cl. .......................... 72/316; 72/306; 72/319
[58] Field of Search ..................... 72/319, 323, 306, 72/413, 478, 316

[56] References Cited

U.S. PATENT DOCUMENTS

| | | | |
|---|---|---|---|
| 4,722,214 | 2/1988 | Hayashi et al. | 72/319 |
| 4,930,332 | 6/1990 | Hongo | 72/478 |

FOREIGN PATENT DOCUMENTS

| | | |
|---|---|---|
| 0 105 091 A2 | 4/1984 | European Pat. Off. . |
| 0 257 015 A2 | 2/1988 | European Pat. Off. . |
| 0 258 204 A2 | 3/1988 | European Pat. Off. . |
| 0 274 159 A2 | 7/1988 | European Pat. Off. . |
| 0 310 145 A2 | 4/1989 | European Pat. Off. . |
| 0 682 996 A2 | 11/1995 | European Pat. Off. . |
| 0 694 346 A1 | 1/1996 | European Pat. Off. . |
| 167731 | 1/1983 | Japan ...................................... 72/319 |
| 148021 | 9/1983 | Japan ...................................... 72/319 |
| 61-103626 | 6/1986 | Japan . |
| 154822 | 6/1989 | Japan ...................................... 72/478 |
| 41020 | 2/1992 | Japan ...................................... 72/478 |
| 190447 | 7/1994 | Japan ...................................... 72/478 |

OTHER PUBLICATIONS

Office Action for German priority Application No. 196 36 463.9 dated Apr. 3, 1997.
International Preliminary Examination for related PCT Application No. PCT/EP97/04006.
*Patent Abstract of Japanese Patent JP 61103626 (in English).
International Search Report for related PCT Application No. PCT/EP97/04006 and English translation.

*Primary Examiner*—Daniel C. Crane
*Attorney, Agent, or Firm*—Akin, Gump, Strauss, Hauer & Feld, L.L.P.

[57] ABSTRACT

A processing machine for plate-like workpieces, especially a bending machine, which has a strip-like vise holder (5) as a workpiece support for supporting the workpiece (1) to be processed and a hold-down device (3) which is subdivided into individual segments (4) which are movable relative to one another in the direction of the bending line, and preferably are also interchangeable in order to be able to be adaptable to differing dimensions and shapes of the workpiece (1) to be processed. In this way, the edges (1a) on a workpiece (1) can be bent such that they can form undercuts, but the separation of this workpiece (1) so processed from the hold-down device (1) nevertheless remains possible. In order here to be able to select almost any desired segments (4) of the hold-down device (3) for a movement, while other segments (4) are not to be displaced, a single coupling element (9) is continuously adjustable in the direction of the bending line for such a group of segments (4), and has a coupling driving unit (13) for engagement into a corresponding matching coupling, preferably a recess (14 and/or 39) on the segment (4) in question, so that the construction of segments (4) is very simple from the perspective of production and construction, and no special measures in reference to segments (4) are necessary for executing a displacing movement.

21 Claims, 10 Drawing Sheets

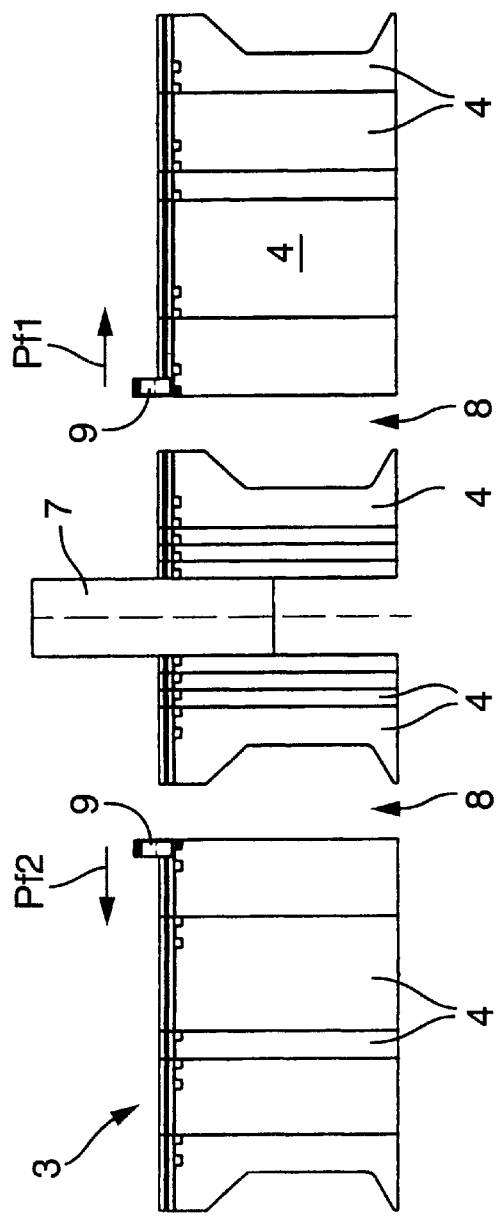
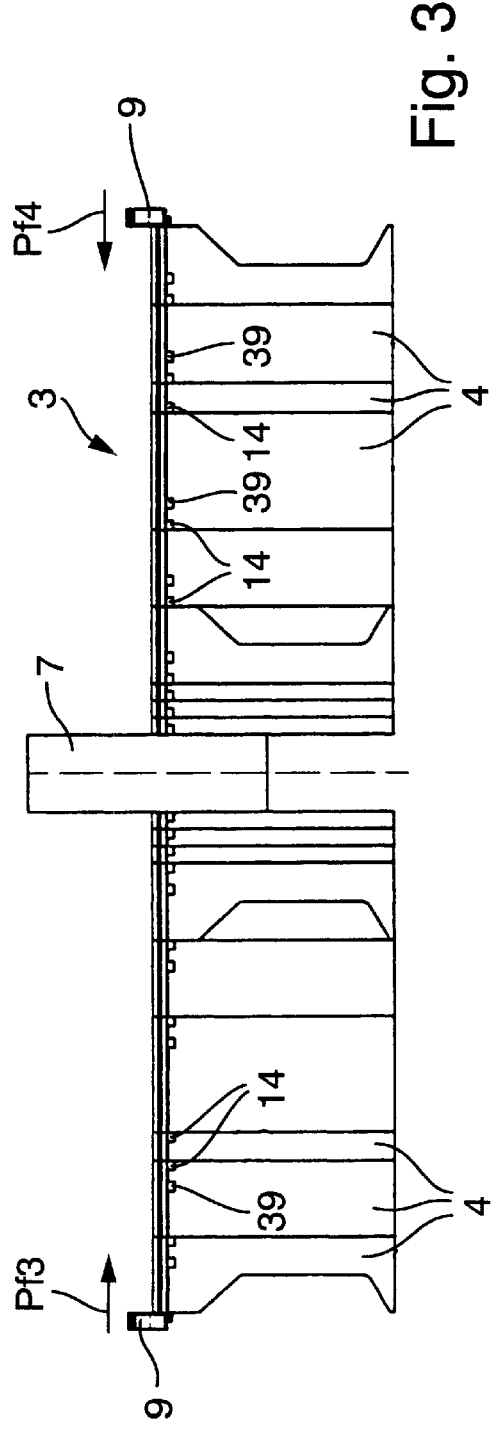

MACHINING CENTER FOR PROCESSING FLAT WORKPIECES WITH A SEGMENT DISTRIBUTED HOLD-DOWN

This application is a continuation of PCT/EP97/04006, filed Jul. 24, 1997.

BACKGROUND OF THE INVENTION

The invention concerns a processing machine for flat workpieces, especially for producing bent edges on sheet parts and/or for cutting or stamping of workpieces formed from sheet metal with a horizontal, and in particular, a strip-like workpiece holder and with a processing tool as well as with a hold-down device subdivided into individual segments arranged near the processing tool for clamping the workpiece on the workpiece holder. The segments are arranged in a row alongside one another in the direction of the orientation of the workpiece holder and a processing line, and in particular a bending line, and are movably and fixably mounted in this direction, whereby they are electively separable or couplable with an adjusting drive extending basically over the length of the hold-down device.

A processing machine of this general type is known from EP-0 258 204 B1. The shifting of individual segments of the hold-down device here serves to take undercuts arising from sheet metal processing into consideration and to be able to remove the hold-own device from the workpiece despite such undercuts. At the same time, the movable segments are individually adjustable by means of an adjusting rod in connection with the known processing machine, whereby each segment has its own clamp coupling for connection with this adjusting rod. In the coupled position, the segments are carried along and moreover displace the additional segments lying in front of the coupled segment viewed in the direction of adjustment.

Thus, a great expenditure is necessary for being able to selectively adjust individual segments or groups of segments, because each segment requires its own clamp coupling with an associated activation. To be able to selectively connect the segments with the adjusting rod or a carrier, they have recesses running transversely to the adjusting rod in which in any given case a clamping element can be moved. Each clamping element must be loaded in the clamping seat by two clamping springs whose force must be cancelled out by adjusting cylinders. These adjusting cylinders require appropriate bore holes for a pressure medium. A pilot valve is necessary for control in any given case which for its part needs an appropriate connection with a control. The individual segments must thus also have a minimum dimension in order to be able to accommodate the coupling which consists of clamping elements and activating elements in any given case.

SUMMARY OF THE INVENTION

There thus exists the objective of creating a processing machine of the type mentioned at the beginning in connection with which the coupling expense of the movable segments is diminished and simplified.

The accomplishment of this objective is provided in that, on the adjustment drive, a coupling element is continuously adjustable or movable in the direction of the row formed by the segments, and the coupling element is couplable with a segment in any arbitrary position of the latter, and in that each segment has a matching coupling for separable connection with the adjustable coupling element.

Consequently, it is not necessary to provide a clamping coupling on each segment, but rather a single coupling element suffices which can be brought into engagement with a correspondingly simply configured matching coupling in order to be able to continuously adjust selected segments. It is merely necessary for the only coupling element to be adjusted or moved to a segment in question, to connect it with this segment, after which a further adjustment of the coupling element makes possible the corresponding adjustment of the segment, and additional segments lying in front of it in the direction of adjustment. Consequently, none of the segments itself needs a complete clamp coupling which is selectively clamped on or removed from an adjustment rod. Rather, a matching coupling which is very simply configured suffices, and which can, for example, be constructed as a recess or projection for interacting with a complementary projection or a recess on the coupling element.

There moreover results the considerable advantage that the coupling element can be brought into a new position even during a bending process in order to be able to execute a new or farther adjustment directly following such a bending process. The time of the actual processing operation can thus be used to bring the coupling element into a new position.

It is particularly expedient if the element of the adjustment drive which carries the coupling element is arranged in an interior cavity within a carrier holding the segments arranged alongside one another, and if the coupling element has a projecting coupling driving unit projecting area-wise in relation to its confines which in the coupling position protrudes in relation to the adjacent area of the contour of the carrier. The arrangement of an interior cavity of the carrier protects the coupling element and the adjustment drive from contamination and avoids an additional space requirement. Moreover, in this way the coupling element can be placed such that it can, for example, be pushed above the segments when the coupling driving unit is moved into place. After it has been rotated, however, the coupling drive can engage into the appropriate counter coupling of the segment from above. There results a space-saving, compact and nonetheless effective construction in connection with which at the same time a danger of contamination of the coupling elements is largely ruled out.

The coupling process becomes especially simple if the adjustment drive is a linear drive and if the coupling element is rotable on the adjustment drive about an axis parallel to the adjustment drive or oriented in the direction of orientation of the adjustment drive, and this way the coupling drive (preferably constructed as a projection) is pivotable about this axis into the coupling position or out of the coupling position. Further, it is beneficial if the adjustment drive constructed as a linear drive protrudes above the row of segments at least on one side and has a drive motor in this protruding area. This way, only little space is required for the moving drive in continuation of the row of segments. Above all, the coupling element can simply be moved into the respective position corresponding to a segment to be adjusted, and then swung into the coupling position there in order to be able to displace further segments situated in front of it by a ether adjustment movement in the direction of adjustment.

It is especially advantageous if a worm drive with a rotable spindle, and owing to this a nut adjustable axially on the spindle, is provided, and if the coupling element is pivoted in or on the nut of this worm drive, and the spindle is adjustable in an axial direction by rotating the stationary spindle by means of the nut. By rotating the spindle, the nut belonging to the worm drive can thus be adjusted in an axial direction parallel to the row of segments so that the coupling element borne by this nut can likewise be appropriately adjusted. In the coupling position, shifting of individual segments can moreover take place in this way. Consequently, little space is needed in an axial direction for the adjustment drive because it suffices to couple a drive motor on the spindle. Therefore, a space-occupying pushing and pulling rod for adjusting the segments is avoided.

Parallel to the linear drive or the spindle, an adjustment element can run for rotating the coupling element into and out of coupling engagement. Consequently, the coupling can first of all be brought into the coupling position by rotating the spindle and then be coupled in with the aid of the parallel adjustment element and uncoupled again following a sliding motion of the segments.

Here it is expedient if a toothed shaft runs parallel to the spindle which carries the nut with the coupling element which is rotable in relation to it and which is adjusted in the direction of the series of segments, whose axially-running teeth mesh with a matching gearing arranged on the coupling element or a gear segment. Such a toothed shaft can be arranged in a space-saving manner parallel to the spindle, but does not hinder the axial adjustment of the coupling element because its teeth can be pushed in an axial direction along the gears of the toothed shaft. In each position, however, the coupling element can then also be rotated by turning the toothed shaft.

The toothed shaft can be arranged and mounted above the spindle within the carrier for the segments in an interior longitudinal cavity. Consequently, this shaft is also protected and accommodated in a space-saving manner, and is situated at a place on which the actual coupling process, that means the swinging in and out of the coupling driving unit into the matching coupling, is not hindered.

The previously described features and measures with respect to the arrangement of the coupling element and its adjustment drive in the operating position above the segments have the considerable advantage that the segments are kept individually separable on the carrier. Consequently, it is possible to separate individual segments from the row and thereby to alter the overall dimension of the hold-down device. It can be correspondingly well adapted to a workpiece in question.

So that the segments are on the one hand movable and reachable by the coupling, and on the other, however, nonetheless simply interchangeable, it is beneficial if the carrier has two grooves or undercuts staggered in relation to each other open toward the same side which are set at a distance to each other horizontally, into which the protrusions arranged on the segment in question fit, between which the front face having the matching coupling runs. In the uncoupled position, such an unlatched segment can be pushed in the direction and this way released from the connection in which the grooves are open, appropriately perhaps in a horizontal direction, and at the same time traverse to the sliding direction and toward the side toward at which the grooves are open. Consequently, the individual segments can be hooked with the grooves in the operating position and be pushed in the direction of orientation of these grooves without difficulty according to a yet to be described opening of the grooves or a mounting, but removed from these grooves transversely to the direction of displacement.

For separable fixation of the segments in their respective operating position, to which a certain displaceability also belongs, it is appropriate if the carrier bears at least one or several continuous connection strips which has or have one or more retaining rails overlapping the segments in their retaining area, through which the segments can be fixed on the carrier in their engagement position. During a movement of the segments, the connection strip needs to be only slightly loosened. In contrast, it can be correspondingly opened for exchanging or removing segments.

It is moreover advantageous if the connection strips are adjustable into an open and closed position by means of working cylinders arranged over their length, and preferably embedded in the carrier. Since these working cylinders are all to be activated simultaneously for loosening or opening or closing the connection strips, there results a very simple activation.

The retaining rail of the connection strips can be subdivided into individual comb-like rails, and the distance between individual rails can be less that the width of the segments oriented in the direction of displacement, even of the narrowest segment. This way it is assured that even with narrow measurement tolerances, each segment can be securely clamped in its holding position. With a connection strip with a continuous retaining rail, it cannot be ruled out with certainty that one or other segment could remain somewhat loose due to bracing on neighboring regions. The individual segments nonetheless can compensate for small differences in measurement in the course of the row of segments on the basis of clamping power and a certain internal elasticity.

The retaining rail or its individual rails can have an arrangement on the carrier and an arrangement on the segment. This way, a more secure latching and a good mounting of the segments is attained, even if within a series, one or more segments are detached and removed. The individual rails engaging wholly or partially on a respective segment therefore attain a sufficient hold even if a segment is temporarily missing.

In addition to the connection strip and if need be instead of the connection strip, a latch for fixing the holding position of each segment on the carrier can be provided on each segment, which latch can be arranged adjacent to the projection set off from the connection strip which engages into the deeper lying undercut on the carrier. The latch, in particularly vertically mobile on the segment and somewhat overlapping the carrier in the latched position, can thus prevent the segment from being removed from the undercut. This is above all advantageous if one or another segment is to be removed. For this, the connection strip must be opened so that it is appropriate if all segments which are not to be removed are fixed in their latches so that a segment cannot slip out of its mounting unintentionally. For this latch, a continuous longitudinal recess can be provided on the carrier into which the latch engages in the locking position so that does not have to project over the front or outside of the carrier.

Each segment can have at least one recess as a matching coupling for the coupling projection or coupling driving unit of the coupling element on its upper front face in an operating position located between the projections interacting with the undercuts of the support, the width of which approximately corresponds to that of this coupling projection in the displacement direction. Consequently, a very simple matching coupling results which is already realized through a recess. This can be applied on the front face without difficulty, for example, countersunk, so that no expensive fastenings of coupling elements to the individual segments are needed. Here it is especially beneficial if the recess serving as a matching coupling is open on a segment toward a side in a direction of movement and is bounded by the adjacent segment. A recess unilaterally open in this form can be even more simply applied. In addition to this, the recess can be jointly used when separating the segment to be displaced from the segments not to be displaced.

It is therefore advantageous when the coupler drive has a greater width than that of the open recess on the one side, and an inlet slope is provided on it or the recess. This way, it is assured during coupling that the segment with the recess is somewhat separated from its neighboring segment so that, possibly during movement, a segment sticking owing to oil or the like cannot be unintentionally be moved along with it.

Restricted recesses can be provided on both sides of wide segments as a matching coupling. In the event that these restricted recesses on both sides are present in addition to a recess open on the edge side, thus only a one side restricted recess, the user has the choice of whether to couple an individual segment on a two side restricted recess or, however, chiefly in moving several segments together from segments not to be separated, to engage into the edge-side open recess with the coupling projection or coupling driving unit. Wide segments can if need be also have an edge-side open recess on their two edges in any given case in order to be able to selectively separate segments situated to their left and right.

For larger processing machines for processing large workpieces or possibly also simultaneously several workpieces, it is appropriate and advantageous if in any given case a series of segments is provided on both sides of a central slide adjustable in a transverse or vertical direction with a coupling element at all times adjustable relative to this. Such processing machines with a removable central slide are inherently familiar and permit multifaceted processing over a large dimension of workpieces, whereby when removing the central slide, additional displacement possibilities can arise for the remaining segments. In such case, the arrangement of the invention of a coupling element on an adjustment drive can be used in the same way, whereby then in any given case such a coupling element with associated drive is to be provided for the group of segments situated on both sides of the central slide so that the segments arranged on both sides of the central slide can be displaced individually or in groups in any given case.

It was already indicated in connection with the matching couplings configured as recesses that segments of different dimensions or different widths can be interchangeably combined. This way the adaptation of the processing machine and in particular its hold-down device to variously dimensioned workpieces is further improved.

A further configuration of the processing machine of the invention provides that the carrier bearing the segments separably (which ends with the central slide in any given case in connection with a processing machine with a central slide) for its part is movably mounted in the direction of its longitudinal extension and parallel to the bending line and fixable, for example, capable of being clamped fast. This way, an adjustment of the entire package of segments can be executed without the coupling element having to be used. Moreover, an adjustment of individual segments and an adjustment of the arrangement of segments created thereby can be implemented, that is, both adjustments and adjustment movements can be combined or superimposed with one other. Above all a displacement movement of the respective carrier away from the central slide can be implemented without difficulty, and if the central slide is removed, the carrier can also be displaced in the opposite direction. For example, to place packs of segments separated by a central slide together, the carrier, for example, can be mounted and be fixable on a dovetail guide.

The drive motor for the spindle for adjusting the coupling element can be an electric motor which is coupled with a synchro-transmitter. This permits a very simple measurement of the respective position of the coupling element and a repetition of certain adjustment movements. That means that the adjustment of the coupling element can be preprogrammed and be conducted through the synchro-transmitter.

The pivot drive for the gear shaft for pivoting the coupling projection can be blocked in or out of engagement in relation to the drive motor for the spindle such that it is activatable only in connection with a standing spindle drive. In this way, rotation of the coupling element into coupling engagement during its axial adjustment can be prevented if the coupling drive is not in agreement with a recess or, in the opposite case, an uncoupling process can take place during an adjustment of the coupling element with the segments coupled with it.

Principally, with the combination of individual or several of the previously described features and measures, a processing machine results, especially for edging or bending sheet metal and sheet parts, the hold-down device tool being adaptable to the most varied dimensions by displacing the individual segments which form the hold-down device, whereby the displacement of individual segments for forming variously dimensioned groups of segments can be implemented very simply with a single coupling element without expensive clamping devices or the like being needed on the individual segments. Rather, matching couplings to the coupling element are provided, for example in the form of recesses. The adjustment drive and drive elements can also be very simply and robustly configured, for example, in the form of a worm drive and a toothed shaft. Moreover these drive mechanisms and the coupling element can be accommodated and well protected inside the carrier for the segments so that they do not require additional space.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings an embodiment which is presently preferred. It should be understood, however, that the invention is not limited to the precise arrangements and instrumentalities shown. In the drawings:

FIG. 2 is a schematic representation of a displacement position of the segments such that in any given case the hold-down device formed by them has a gap;

FIG. 3 is a representation similar to FIG. 2, in connection with which all segments are pushed together, whereby at the same time, as is indicated in FIG. 2, the central slide can moreover be lifted;

DETAILED DESCRIPTION OF THE INVENTION

Figure 1:
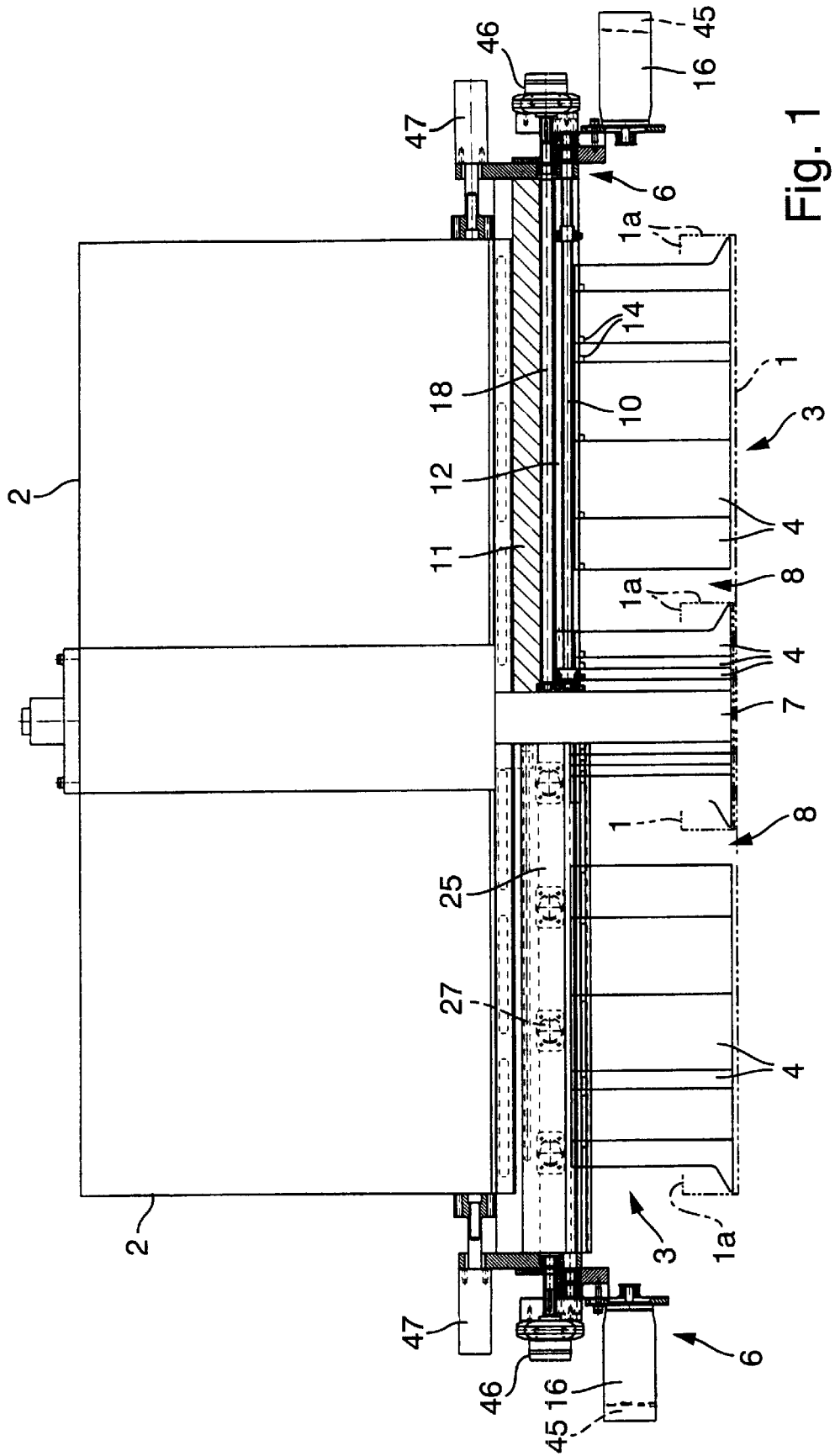
FIG. 1 is a view, partially in section, of a beam of a hold-down device which is subdivided into segments for a processing machine for plate-like workpieces, with the drive and the guides accommodating the beams as well as the machine frame having been left out for the sake of a better overview, and a central slide which separates two groups of segments from each other is mounted in the middle of the beam, each of which has a drive mechanism for moving the segments.
Figure 4:
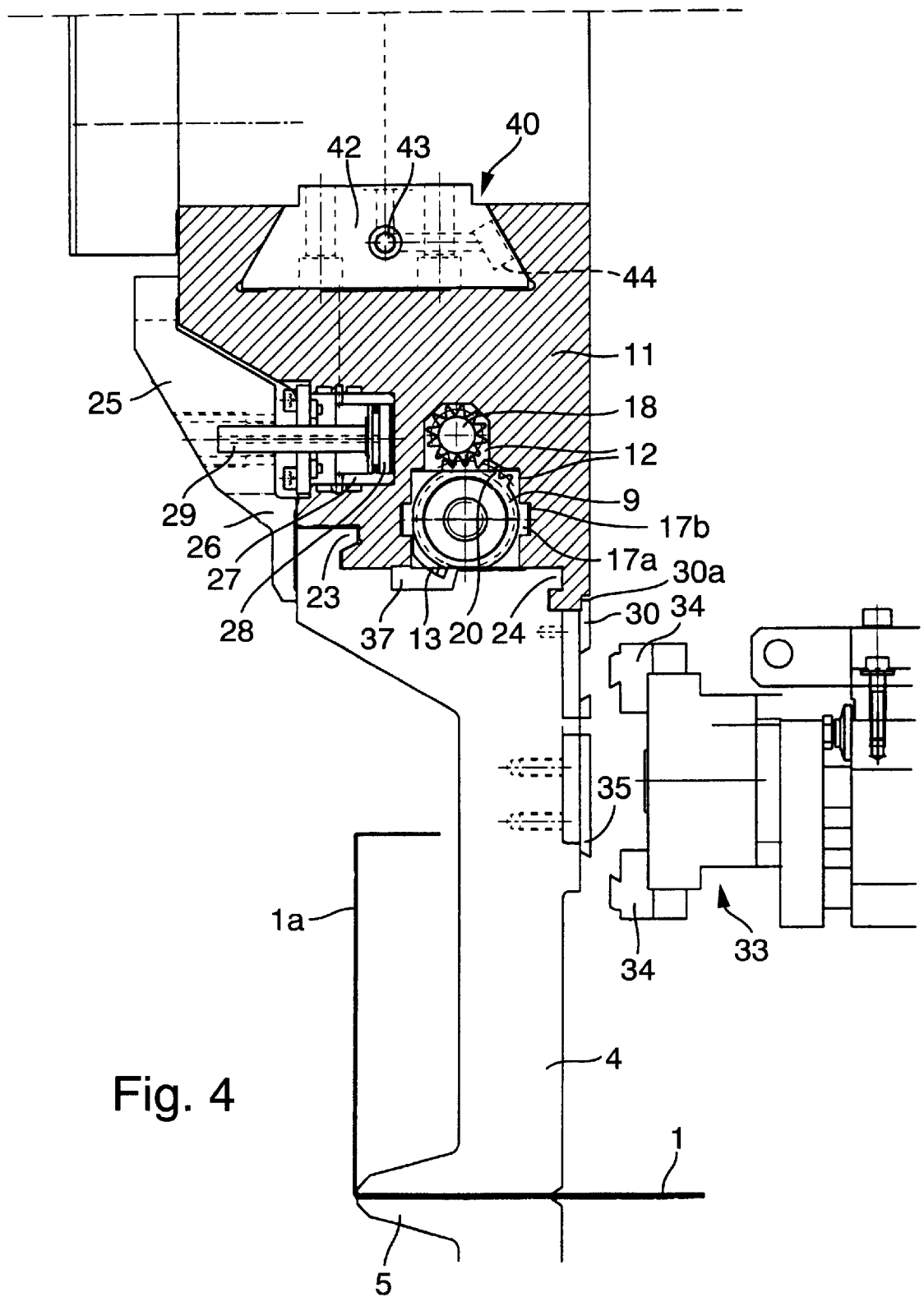
FIG. 4 is an enlarged view having a cross section of a carrier joined with the beam in whose longitudinal direction the segments are individually or jointly movable, whereby the carrier contains an adjustable coupling element in its interior which is movable into a desired position for coupling with a selected segment in any given case, and a side view of a segment fixed on this carrier by means of a connection strip and a latch, with the coupling element being disengaged.

A processing machine is shown in FIG. 1, in which a beam 2 is shown and the driving element and the guides have been omitted for clarity. The processing machine is for processing work pieces 1 indicated in dotted lines in FIG. 1, and partially indicated in FIG. 4, which are made of sheet metal and which are to be provided with bent edges 1*a*. The lower longitudinal edge of the processing machine includes a hold-down device designated overall with 3 which is subdivided into individual segments 4. The workpiece 1 can therewith be clamped on a workpiece support 5, as shown in FIG. 4, which appropriately extends over at least the entire length of the hold-down device 3. The bending tool for bending the edges is moreover not represented in the drawings for the sake of simplicity.

The segments 4 are arranged in a row alongside one another in accordance with FIGS. 1 to 3 and 14 in the direction of orientation of the workpiece support 5 and the beam 2, and therewith to a processing line in the case of a bending machine, thus in the direction of a bending line, and are mounted to be either movable or fixable in this direction in accordance with the arrows Pf1, Pf2, Pf3 and Pf4. The segments are selectively separably couplable with an adjustment drive (generally designated with 6), basically extending over the length of the hold-down device beam 2 in question in a manner to be described.

In the embodiment in accordance with FIG. 1, two hold-down devices 3 comprised by segments 4 are provided with an adjustment drive 6 and are situated on both sides of a height adjustable central slide 7 arranged between. The two hold-down devices 3 and their adjustment drive mechanisms 6 are arranged in practically mirror image symmetry to this central slide 7, so that correspondingly many processing possibilities arise in an inherently familiar manner, since, for example, workpieces 1 of various sizes can be processed according to the arrangement of gaps 8 between segments 4.

In order to move individual segments 4 or groups of such segments 4, as already mentioned, in the described embodiment a single coupling element 9 is continuously adjustable or movable on the respective adjustment drive 6 in the direction of the rows formed by the segments 4 and in the direction of the extension of the beam 2. The adjustment drive 6 moreover brings about this displacement of the coupling element 9 in a manner yet to be described. This coupling element 9 can be coupled with this in any desired position of a segment 4, whereby each segment 4 has a yet to be described matching coupling for separable connection with this adjustable coupling element 9. It is thus possible to couple the coupling element 9 of the two adjustment drives 6 in any given case with any desired segment 4 of the respective hold-down device 3 in order to be able to move this corresponding segment 4 then longitudinally, whereby segments situated in front of the segment in the direction of displacement are moved along with it (FIGS. 2 and 3).

The element of the adjustment drive 6 carrying the coupling element 9 in a manner to be described, namely a rotatably drivable spindle 10, is arranged within a carrier 11 which retains the segments 4 arranged alongside one another on the beam 2 in accordance with FIGS. 1 and 4 to 6 as well as 10 and 11. The drivable spindle 10 is arranged in an interior cavity 12 of this carrier 11 in the described embodiment, which interior cavity 12 extends over the length of the carrier 11.

Figure 11:
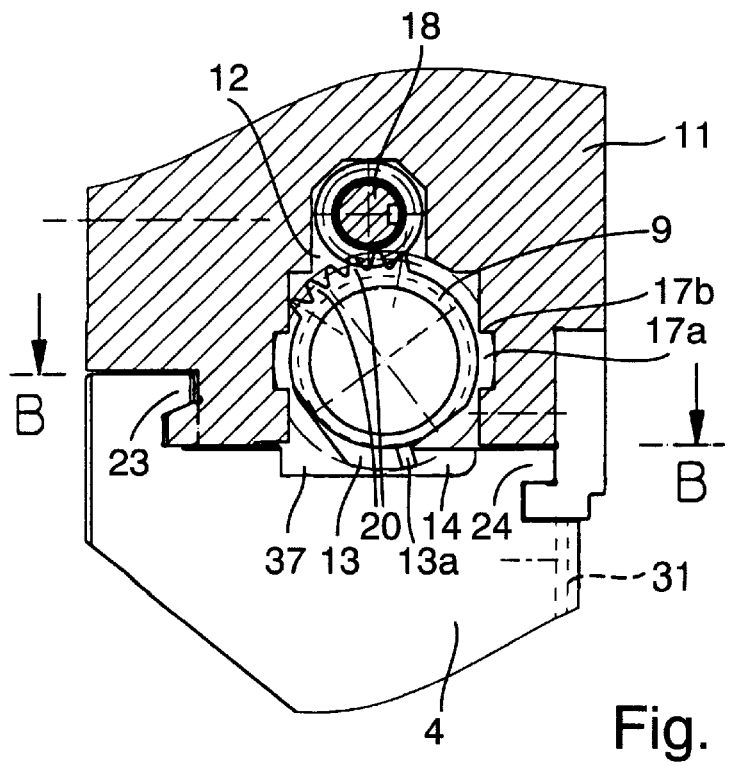
FIG. 11 is a view corresponding to FIG. 10 after pivoting the coupling element so that its coupling engages into a matching coupling of the segment configured as a recess.
Figure 12:
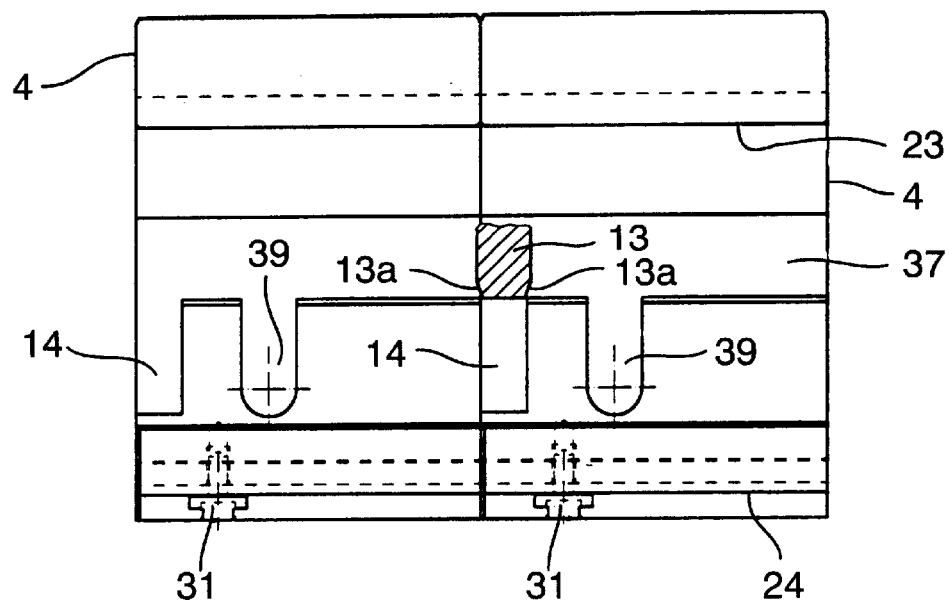
FIG. 12 is a cross section taken along line A—A in FIG. 10 through the coupling area and at the same time through the coupling driving unit with a plan view of a segment, whereby the coupling driving unit is out of engagement.
Figure 13:
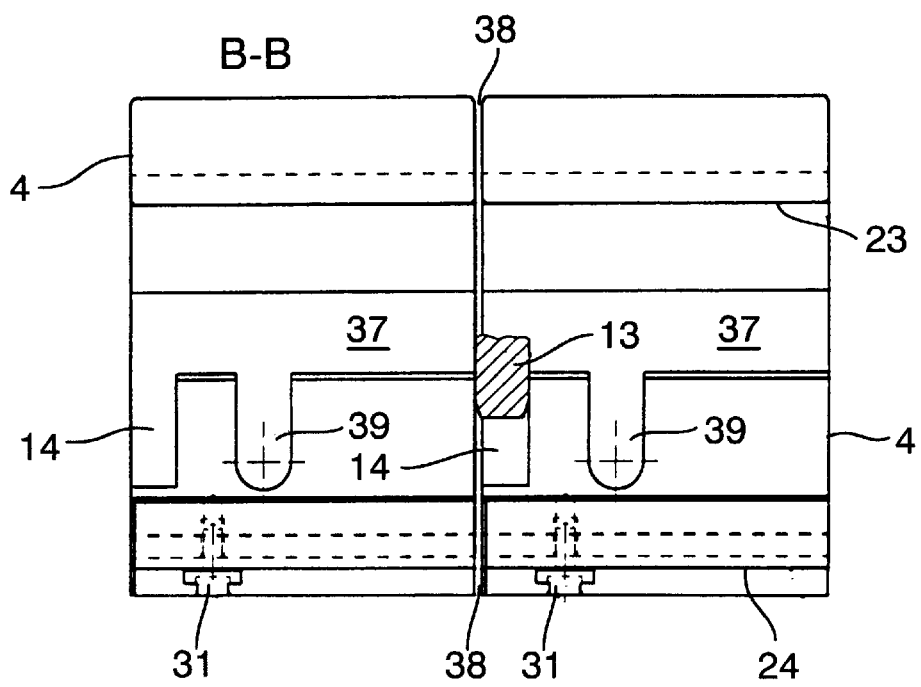
FIG. 13 is a cross-section through the coupling area and through the coupling driving unit situated in coupling engagement, taken along line B—B in FIG. 11.
Figure 14:
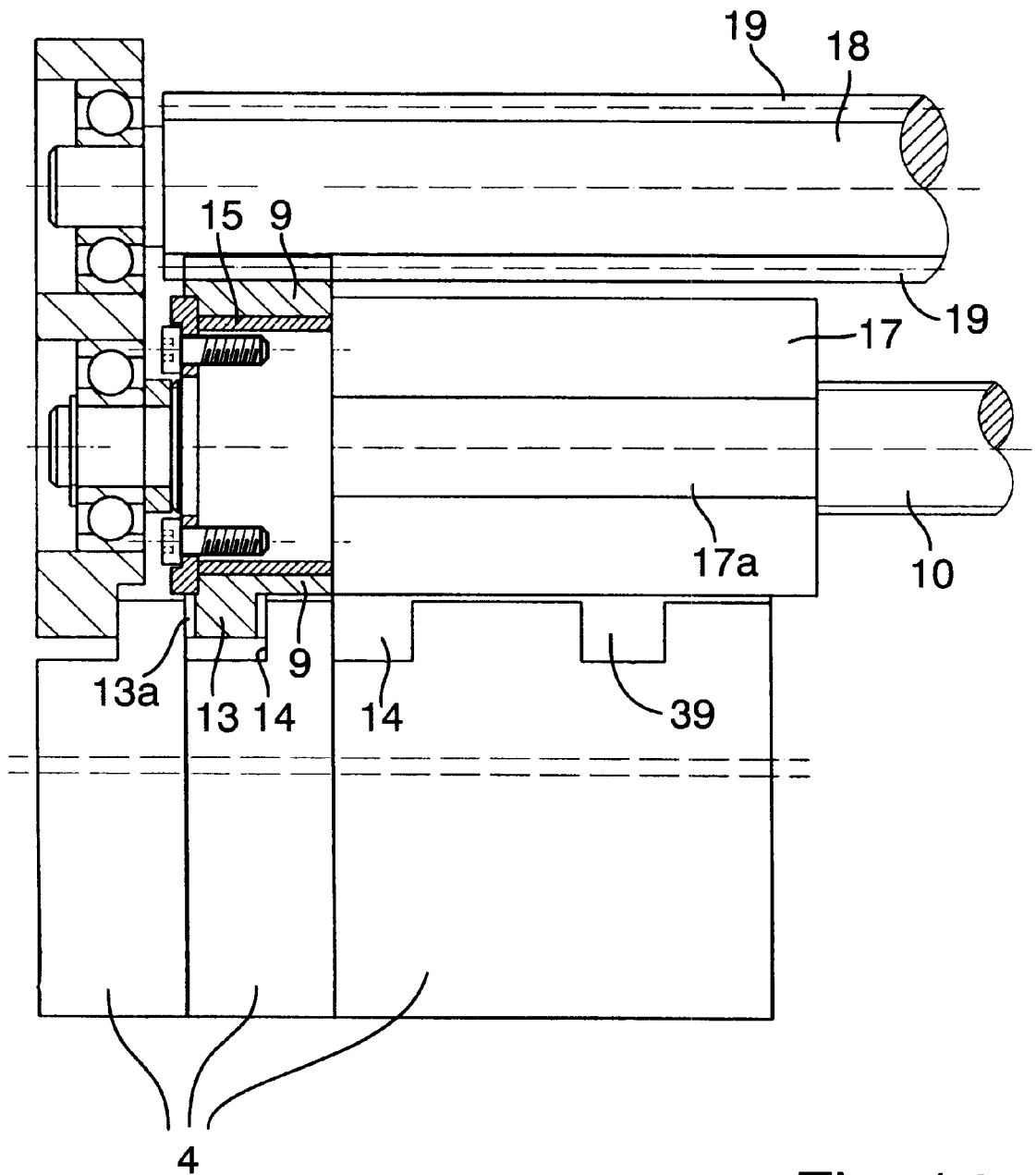
FIG. 14 is a cross-section view of a coupling element and the nut of a worm drive carrying this coupling element rotable relative to it, and the toothed shaft which serves to rotate the coupling element in the area of its mounting far from the driving element.

As will be recognized from FIGS. 10 to 14, the coupling element 9 has a coupling driving unit 13 projecting areawise in relation to its periphery or its outer contour (downward in the embodiment) in the coupling position in accordance with FIGS. 11, 13 and 14 in relation to the area of the contours of the carrier 11 adjacent to it and engages into a matching coupling of a segment 4.

It should be mentioned at this point that the matching coupling is a recess 14 in the embodiment which represents a form of such a matching coupling which is especially easy to manufacture and handle. The coupling element 9 can be uncoupled from this coupling position relative to the adjustment drive 6 and the matching couplings of segments 4 constructed as recesses 14, whereby such an uncoupled position is represented in FIGS. 4 to 6 and 10 and 12.

So that the coupling driving unit 13 can be electively swivelled into a recess 14 or pivoted back again, the coupling element 9 is pivoted on the adjustment drive 6 about an axis directed parallel to the adjustment drive 6 of in the direction of orientation of this adjustment drive. The pivot bearing 15 of the coupling element 9 is recognizable in FIG. 14 in a section through this coupling element 9 and its pivot bearing 15.

The adjustment drive 6 is a linear drive which protrudes on one side above the row of segments 4 and has a drive motor 16 in this protruding area. The linear drive forming the adjustment drive 6 is a worm gear in the described embodiment, with the already mentioned rotable spindle 10 and a nut 17 carrying the coupling element 9, once again clearly recognizable in FIG. 14, which is secured or blocked against a rotation through two lateral strips 17a which engage axially displaceable in grooves 17b in the interior cavity 12 of the carrier 11, so that a rotation of the spindle 10 leads to an axial adjustment of this nut 17 and therewith of the coupling element 9 borne by this. With the aid of the drive motor 16, the stationary spindle can thus be rotated so that the coupling element 9 is adjustable in the axial direction of the spindle 10 by means of the nut 17. At the same time, it becomes clear in FIG. 14 that the pivot bearing 15 is arranged on a front face of the nut 17 so that the coupling element 9 is situated in front of the nut 17 when viewed from the drive motor 16, and this way can also include segments 4 spaced as far apart as possible.

Parallel to the linear drive, thus to spindle 10, extends an adjustment element, yet to be described in detail with which the coupling element 9 for its part can be rotated on its bearing 15 in order to swing its coupling driving unit 13 into and out of coupling engagement. In the described embodiment, a toothed shaft 18 running parallel to the spindle 10 carrying the nut 17 with the coupling element 9 rotable in relation to it and adjusting the spindle in the direction of the row of segments 4 is provided, whereby this parallel shaft 18 is mounted above the spindle 10. The teeth of this toothed shaft 18 run axially and mesh with a matching gearing arranged on the exterior of the coupling element 9, which thereby has the form of a gear segment 20. One recognizes this on the one hand in FIGS. 4 to 6, and on the other hand especially well in FIGS. 10 and 11, in which both rotation positions of the coupling element 9 and its coupling driving unit 13 are represented. In this way, it also becomes clear that a tooth segment 20, which in this case includes six teeth, suffices to swing the coupling driving unit 13 out of the one into the other position. The basically smaller in diameter toothed shaft 18 can execute a rotation for this purpose based on the translation ratio.

Due to the fact that the toothed shaft 18 above the spindle 10 inside the carrier 11 for the segments 4 is arranged and mounted in the correspondingly shaped interior long cavity 12, a space-saving and also above all protected arrangement of all these drive and gear elements is provided. At the same time, it is assured that the only coupling element for a group of segments 4 can be coupled directly with the respective segment 4 in the area of its mounting on the carrier 11 so that there is the most direct transmission of force possible in connection with a displacement movement.

At the same time, the segments 4 are held individually separable on the carrier 11. That means that they can not only be moved, but also removed to form more or less greater gaps 8 and/or be replaced by segments 4 of other dimensions. This separable mounting of the segments 4 can be recognized and explained on the basis of FIGS. 4 to 9.

The carrier 11 has in the described embodiment two grooves 21 and 22 staggered as to height in relation to each other which are open toward the same side, namely the reverse side (see especially FIG. 6) which one can also designate as undercuts in relation to a vertical. The two grooves 21 and 22 are at a distance from each other viewed horizontally and run parallel to each other in the direction of the extension of the carrier 11. Projections 23 and 24 arranged on the segments 4 fit in the grooves 21 and 22, and correspond to the appropriate dimensions of grooves 21 and 22 in their distance, size and height, and between which the front face of the respective segment 4 having the recess 14 as a matching coupling extends. If both projections 23 and 24 are in engagement in the grooves 21 and 22 in accordance with FIGS. 4 or 10 and 11, the coupling element 9 and its coupling driving unit 13 also has the proper position in relation to the matching coupling constructed as a recess 14.

In order to fix the segments 4 in their respective position, the carrier 11 in the described embodiment has a connection strip 25 which has a retaining rail 26 overlapping the segments 4 in their holding area, and especially in the area of the projection 23 engaging into groove 21 from above. The segments 4 are fixable in their engagement position on the carrier 11. One clearly recognizes above all when simultaneously comparing FIGS. 4 to 6 and especially also on the basis of FIGS. 7 to 9 that the connection strip 25 is effective in the direction which points toward the 21 and 22 so that thus when the retaining rail 26 is pressed upon in accordance with FIGS. 4 and 7, it is not possible to guide the projections 23 and 24 out of their grooves 21 and 22.

Consequently, there exists on the one hand an effective mounting which on the other hand, however, can be very simply opened and which also permits moving the segments 4 in the loosened state without these being able to slip out of their mounting.

The adjustment of the connection strip 25 takes place by means of working cylinders 27 arranged alongside one another over its length and embedded in the carrier 11, with pistons 28 which are adjustable relative to the cylinders 27 whose piston rod 29 is connected with the connection strip 25.

Figure 8:
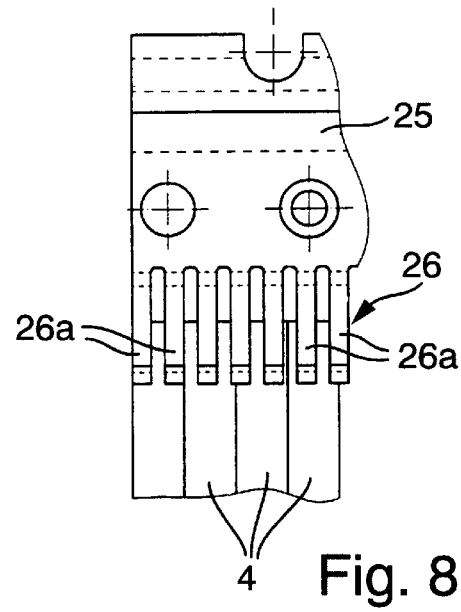
FIG. 8 is a view of a connection strip and its retaining rail subdivided into individual comb-like rails.

So that even with different widths of the segments 4 all segments 4 are held secure and fast by the connection strip 25, the retaining rail 26 is subdivided into individual comblike rails 26a in the embodiment in accordance with FIG. 8, whereby the width and distance of the individual rails 26a is less than the width of the segments 4 oriented in the direction of displacement, even of the narrowest segment 4. In FIG. 8, one will recognize clearly that in this way at least one individual rail 26a engages on a segment 4. On the other hand, this application is, however, dependent upon the adjacent individual rails 26a in any given case. Since the individual rails 26a have a certain elasticity and spring action, each segment 4 is pressed upon by one or more individual rails 26 in its operating position.

Figure 9:
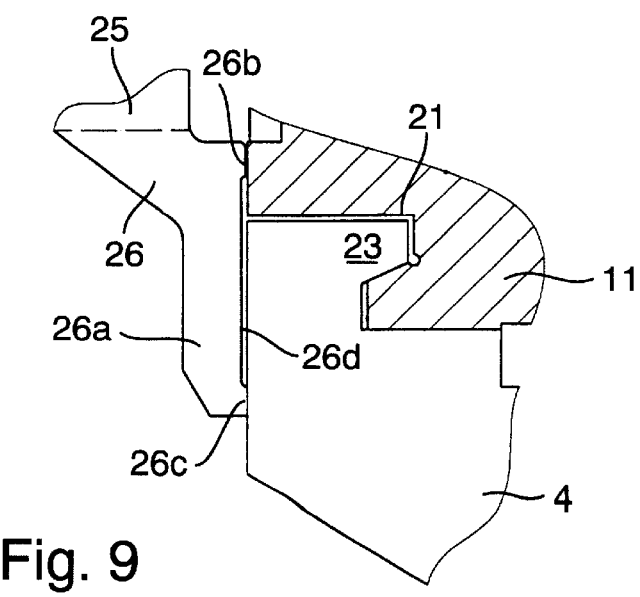
FIG. 9 is a greatly enlarged representation of the area marked by a circle designated "A" in FIG. 7, with the two contact points of the individual rails of the connection strip on the carrier and on a segment.
Figure 10:
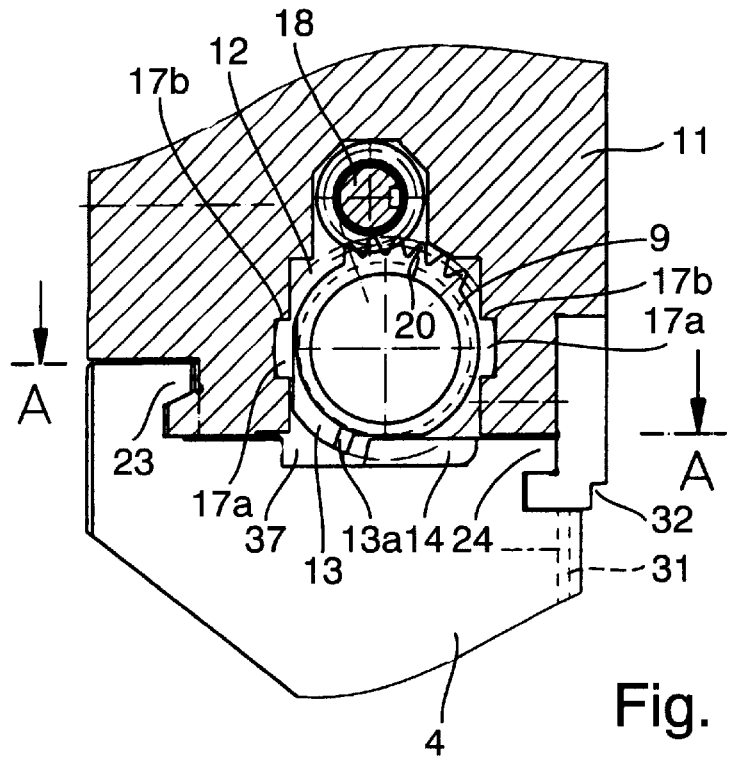
FIG. 10 is a cross section of the opened coupling between coupling element and segment in a cross section of a toothed shaft for pivoting the coupling element.

So that also a good installation of the retaining rail 26 and the connection strip 25 is reached in the area of a gap 8, where one or several segments 4 are missing, the retaining rail 26 has or the individual rails have in accordance with FIG. 9 an arrangement 26b on the carrier 11 and an arrangement 26c on segment 4, and in between a recess 26d. If segment 4 is missing, the retaining rail 26 nonetheless has a support through its arrangement 26b, which, however, is not effective if the individual rod 26a presses with the installation 26c against a segment 4.

Figure 5:
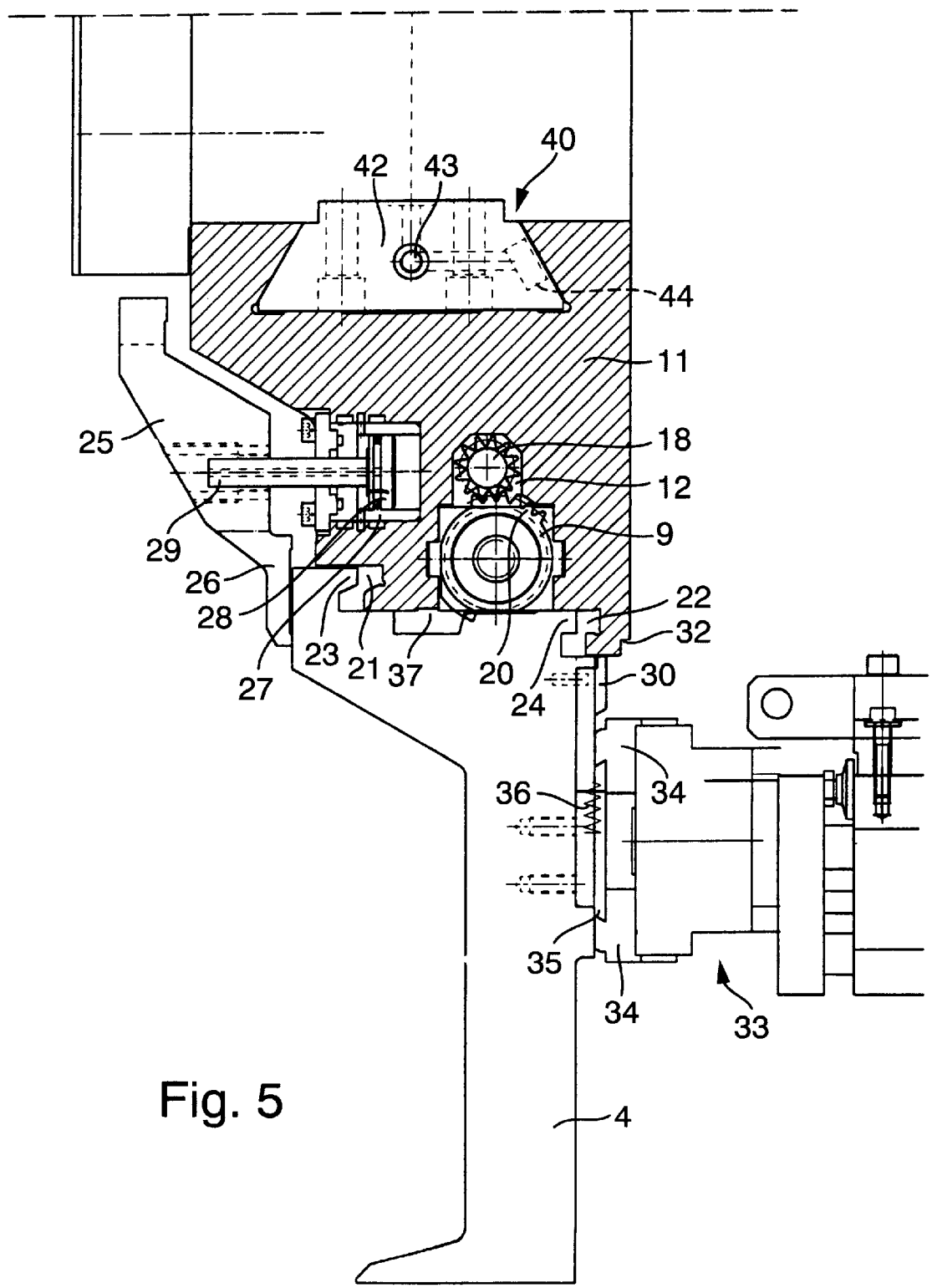
FIG. 5 is a view corresponding to FIG. 4 in which the connection strip is separated by means of a piston drive and the latch situated on the opposite side is opened by means of a gripper, and the segment is moved out of its operating position or is situated just in front of being inserted into its operating position and mounting on the carrier.
Figure 6:
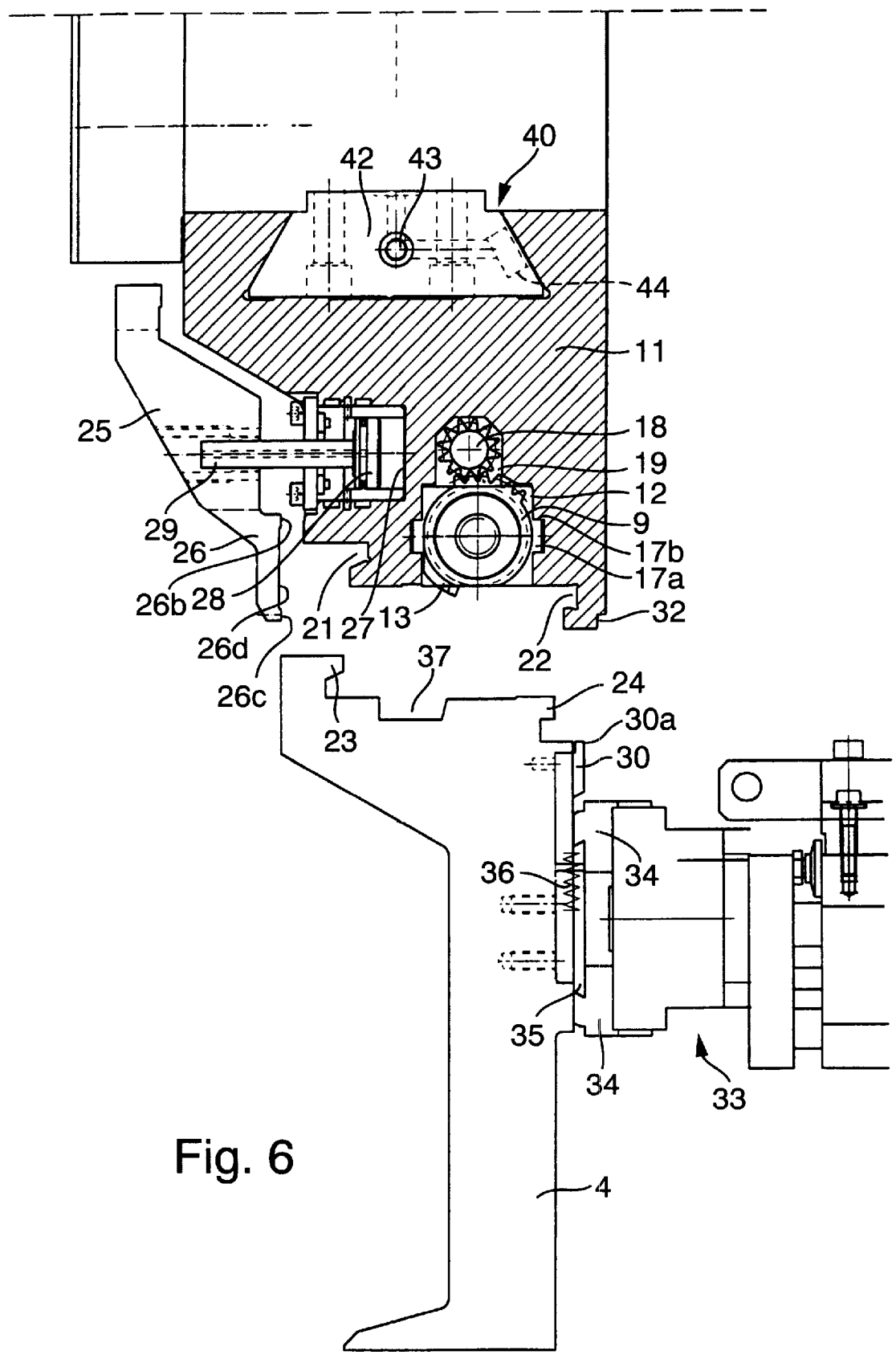
FIG. 6 is a view corresponding to FIGS. 4 and 5 whereby the segment is separated from its mounting on the carrier or is located in front of its insertion into the mounting on the carrier.
Figure 7:
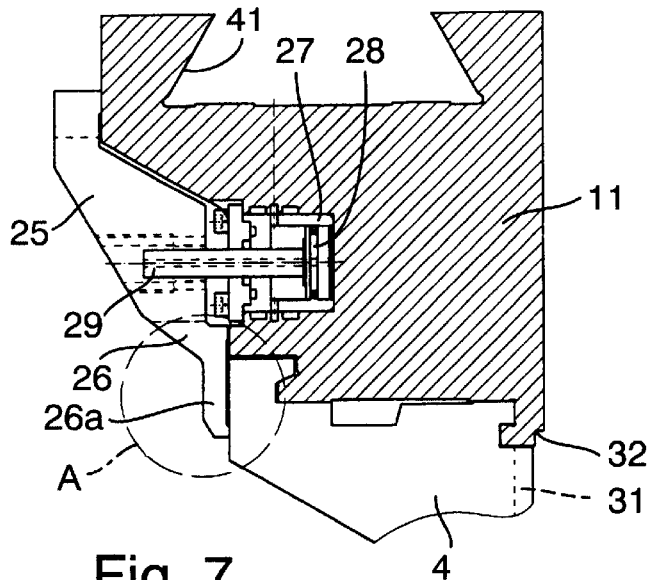
FIG. 7 is an enlarged representation of the carrier for the segments which shows the mounting position of a segment on the carrier and the engagement of a retaining rail of the connection strip on the carrier on the one hand and on a segment on the other.

It is further shown in FIGS. 4 to 6 that in addition to the connection strip 25, a latch 30 is provided on each segment 4 for fixing the mounting position of the segment 4 on the carrier 11, especially when the connection strip 25 is opened or loosened. The latch 30 is arranged adjacent to the projection 24 lying further away from the connection strip, which engages into the undercut 22, and is spaced deeper in the carrier 11 when the segment 4 is in its operating position.

The latch 30 is vertically movably mounted on segment 4 in a guide 31, which is most clearly recognizable in FIGS. 12 and 13, and has the form of a T groove. On carrier 11, a longitudinally continuous depression 32, having a somewhat step-like form in the illustrated embodiment, into which the latch 30 in accordance with FIG. 4 engages with its latch end 30a in the closed position.

A gripper 33 is represented in FIGS. 4 to 6 which is suited for a mechanical opening of the latch 30 and at the same time can grasp a segment 34 after opening the latch and separate it from the entire association. The gripper 33 has clamps 34 adjustable vertically in relation to one another which can engage on a grasping strip 35 on the one hand and on the latch 30 on the other on appropriate projections. The adjustment motions of the clamps 34 first lead to the vertical retraction of the latch 30 downward, through which segment 4 in accordance with FIG. 5 is at the same time grasped firmly so that it can be raised out of its mounting after opening the connection strip 25. Conversely, such a segment 4 can also be brought to the carrier 11 again with the aid of the gripper 33 and inserted into grooves 21 and 22.

The movement of the latch into its closed position takes place through a return spring 36. Upon opening, the latch end 30a is withdrawn so far that it is located beneath the recess 32 of the carrier 11 so that the transverse motion out of the grooves 21 and 22 is not hindered.

Each segment 4, which is provided is both exchangeable and movable, and has at least one recess 14 on its upper front face in the operating position, visible in FIGS. 12 and 13, between the projections 23 and 24 which interact with the undercuts or grooves 21 and 22 of the carrier 11, which, as already mentioned above, serves as a matching coupling for the coupling projection and the coupling driving unit 13 of the coupling element 9. The width of the recess 14 oriented in the direction of motion here almost corresponds to that of this coupling driving unit 13.

At the same time, one recognizes from FIGS. 12 and 13, and farther from FIG. 14, that the recess 14 on a segment 4 serving as a matching coupling is open to one side in a direction of movement, thus perhaps has the form of a negative step. The recess 14 is then bounded by the neighboring segment so that it, bounded at the edge of a segment 4 by the adjacent segment 4, overall has the groove-like cross section recognizable in FIG. 14. Such a recess is especially easily producible.

At the same time, it is indicted in FIGS. 13 and 14 that the coupling driving unit 13 in the illustrated embodiment has a somewhat larger breadth than this unilaterally open recess 14, and that a bilateral inlet slope 13a is provided on the coupling driving unit 13 which can engage into the recess 14. This has as a consequence that when pivoting the coupling driving unit 13 into the recess 14, the segment 4 is somewhat separated from the neighboring segment, and the seam 38 between the two segments recognizable in FIG. 13 arises. This way, it is assured that the movement of the one segment 4 relative to the other also really takes place, and not possibly that the neighboring segment remains stuck on the segment grasped in connection with the displacement.

It is moreover represented in FIGS. 12 to 14 that one, and if need be several, bilaterally bounded recesses 39, can also be provided as a matching coupling on especially wide segments 4, in connection with which then the groove cross section is completely worked into the material of segment 4. The width of these recesses 39 here obviously corresponds to that of the coupling driving unit 13 or exceeds this slightly. Consequently, the segment 4 can be moved in both directions when the coupling driving unit 13 engages into this recess 39, while with engagement into a recess 14 open to the edge side, the displacement of this segment is only possible toward one side.

It was already mentioned that on both sides of a central slide 7 that is adjustable in transverse and vertical directions, a row of segments 4 in mirror image symmetry in each case provided with an adjustment drive 6 and an associated spindle 10 as well as in each case a coupling element 9 controllable and adjustable relative to the segments 4 are provided. This way, the versatility of the corresponding processing machine is appropriately large and, in FIG. 1, various workpieces 1 with bent edges 1a are indicated, which can be engaged at different positions on both groups of segments 4 wholly or partially. The versatility is enhanced in that segments 4 of different dimensions, especially of different widths, are interchangeably combined, which emerges from a comparison of FIGS. 1 and 2. Consequently, an adaptation to workpieces 1 of various sizes can above all also take place based on the exchangeability and interchangeability of the segments 4.

A further extension of the versatility results from the fact that the carrier 11 separably bearing the segments 4 is for its part movable in a direction of its longitudinal extension and parallel to the bending line, in a dovetail guide 40 in the illustrated embodiment, supported and fixable, for example clampable fast. One recognizes the dovetail guide 40 especially well in FIGS. 4 to 7, whereby in FIG. 7, only the dovetail-like groove 41 of carrier 11 is represented. The dovetail-like matching element 42 contains a channel 43 out of which one or more clamping elements 44 can be activated and which are adjustable against the interior of groove 41. Above all, carriers 11 can be moved away from the center in order to be able to move all segments 4 held on them or to be able to move a special adjustment or displacement position of these segments 4. When the central slide 7 is adjusted out of the area of the carriers 11, the carriers 11 can nevertheless also be moved one upon the other.

Figure 15:
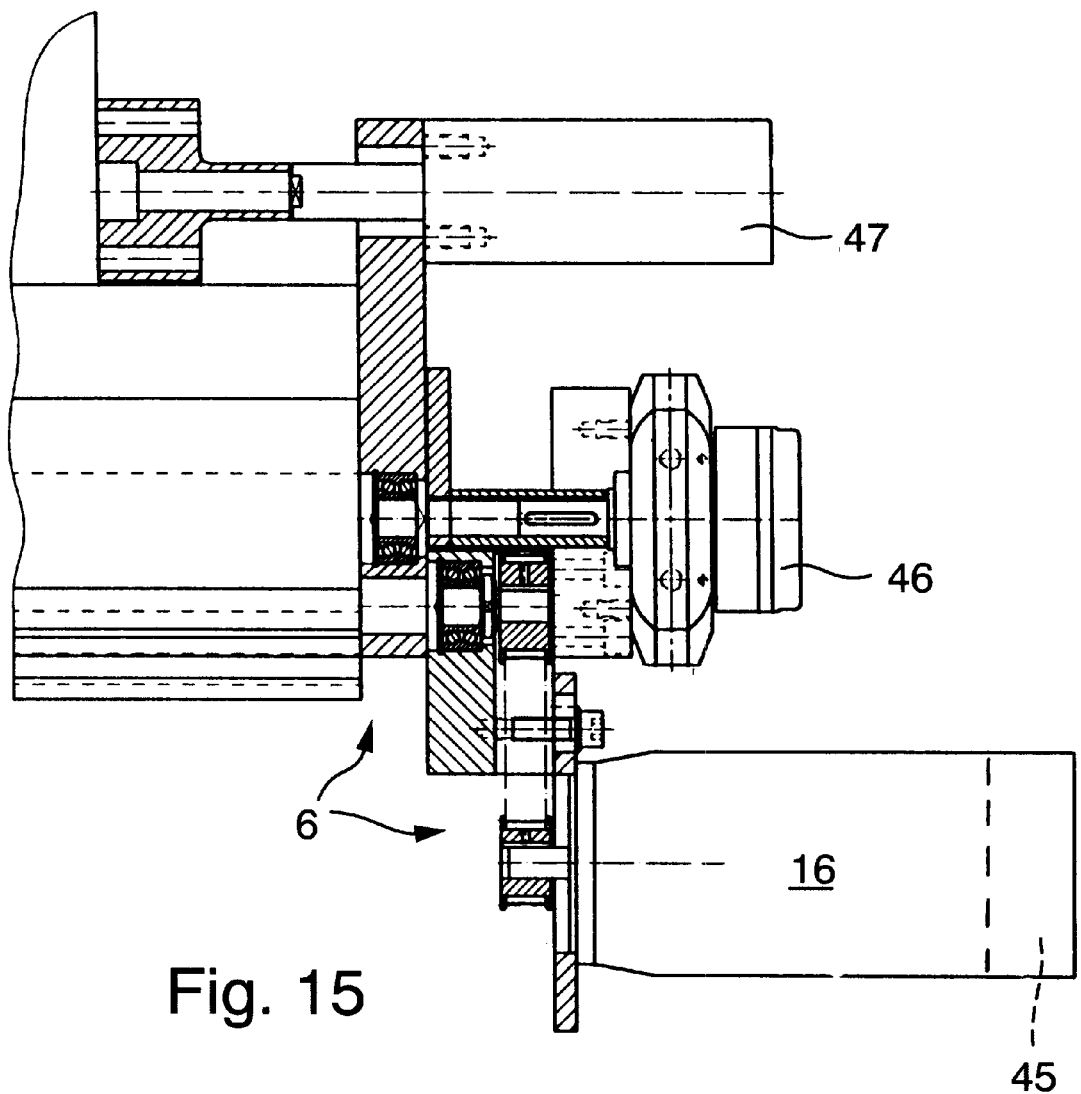
FIG. 15 is a cross-sectional view of the drive of the spindle for the axial adjustment of the coupling element of the series of individual segments with a synchro-transmitter as well as the driving mechanism for the toothed shaft.

The drive motor represented in FIGS. 1 and 15 for the spindle 10 for adjusting the coupling element 9 is an electric motor in the preferred embodiment which is coupled to a synchro-transmitter 45 so that it is possible to repeat and automate the adjustment of segments 4 over and over again, and in particular to preselect from the beginning through an appropriate program control. The synchro-transmitter 45 ensures in an inherently familiar manner that the spindle 10 executes the required number of revolutions and angular rotations in order to bring the nut 17 and therewith the coupling element 9 into the coupling position desired in each case in relation to a selected segment 4.

The pivot drive 46 for the toothed shaft 18 is arranged adjacent to the drive motor 16 and serves to pivot the coupling drive 13 into or out of engagement, and is electrically blocked in relation to the drive motor 16 for the spindle 10 such that it is only activatable when the worm drive is standing. This way, the pivoting of the coupling driving unit 13 into the coupling position during an adjustment of the nut 18 and the coupling element 9 and its thereby being damaged or for its part destroying areas in the segments 4 can be prevented this way.

The coupling driving unit 13 is, as already mentioned, out of engagement in FIGS. 4 to 6. It nonetheless protrudes downward somewhat out of the carrier 11 in the area of the front face of segments 4. Nonetheless, so that axial adjustment is possible without difficulty, a continuous groove 37 is provided on the front face of segments 4 in accordance with FIGS. 4 to 7 and especially in accordance with FIGS. 13 and 14 in the direction of extension of the spindle 10 from which the recesses 14 and 39 proceed in any given case in accordance with FIGS. 12 and 13.

A processing machine for plate-like workpieces, especially a bending machine, has a strip-like vise holder 5 as a workpiece support for supporting the workpiece 1 to be processed and a hold-down device 3 which is subdivided into individual segments 4 which are movable relative to one another in the direction of the bending line and especially also interchangeable in order to be able to execute an adaptation to differing dimensions and shapes of the workpiece 1 to be processed. In this way, the edges 1a on a workpiece 1 can be bent such that they even form undercuts, but the separation of this workpiece 1 so processed from the hold-down device 1 nevertheless remains possible. In order here to be able to select almost any desired segments 4 of the hold-down device 3 for a movement, while other segments 4 are not to be displaced, a single coupling element 9 is continuously adjustable in the direction of the bending line for such a group of segments 4, and has a coupling driving unit 13 for engagement into a corresponding matching coupling, preferably a recess 14 and/or 39 on the segment 4 in question, so that the construction of segments 4 is very simple from the perspective of production and construction, and no special measures in reference to segments 4 are necessary for executing a displacing movement.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

What is claimed is:

1. A processing machine for at least one of producing bent edges (1a) on plate-like sheet metal workpieces (1) and cutting and stamping of sheet metal workpieces, the processing machine comprising:

a horizontal workpiece support (5);

a processing tool;

a hold-down device (3) arranged near the processing tool, the hold-down device (3) comprising individual segments (4) for clamping the workpiece (1) on the workpiece support (5), the segments (4) being arranged in a row alongside one another in a direction of orientation of the workpiece support (5);

an adjustment drive (6) extending generally over the length of the hold-down device (3), the segments (4) being movably and fixably mounted in the direction of orientation and being selectively separably couplable with the adjustment drive;

a coupling element (9) continuously adjustable and movable in the direction of the row formed by the segments (4); and a coupling driving unit (13) adapted to couple the coupling element with the segment in any desired position of the segment (4), each segment (4) having a matching coupling for separable connection with the coupling driving unit (13) of the adjustable coupling element (9), a part of the adjustment drive (6) supporting the coupling element (9) and being arranged within a carrier (11) holding the segments (4) arranged side by side in an interior cavity (12) of the carrier, and the coupling driving unit (13) projecting out in relation to an adjacent area of a contour of the carrier (11), wherein the adjustment drive (6) is a linear drive, and the coupling element (9) is rotatable around an axis parallel to the adjustment drive (6) or directed in the direction of orientation of the adjustment drive, and that the coupling driving unit is thereby pivotable about this axis into the coupling position and out of the coupling position.

2. Processing machine according to claim 1, wherein the linear drive forming the adjustment drive (6) protrudes on at least one side over the row of segments (4) and has a drive motor (16) in this protruding area.

3. Processing machine according to claim 2, wherein a worm drive with rotable spindle (10) and thereby a nut (17) axially adjustable on the spindle (10) is provided as the linear drive, and the coupling element (9) is mounted on the nut (17) of the worm drive and is adjustable by rotating the stationary worm drive (10) by means of the nut (17) secured against rotation in an axial direction of the spindle (10).

4. Processing machine according to claim 1, wherein parallel to the linear drive or the spindle (10), an adjustment element for rotating the coupling element (9) into coupling engagement and out of coupling engagement runs parallel to the linear drive or the spindle (10).

5. Processing machine according to claim 1, wherein parallel to the part bearing the coupling element (9), a toothed shaft (18) runs, whose teeth (19) extend in an axial direction mesh with a matching toothing or tooth segment (20) arranged on the coupling element (9).

6. Processing machine according to claim 5, wherein the toothed shaft (18) runs parallel to the spindle (10) bearing the nut (17) with the coupling element (9) rotable in relation to it, and adjustable in the direction of the row of segments (4).

7. Processing machine according to claim 5, wherein in that the toothed shaft (18) is arranged and mounted above the spindle (10) within the carrier (11) for the segments (4) in an interior cavity (12).

8. Processing machine according to claim 1, wherein the carrier (11) has two grooves or undercuts staggered in relation to one another and open toward the same side which are set at a distance horizontally and into which projections arranged on the respective segment (4) fit, between which a front face having the matching coupling extends.

9. Processing machine according to claim 1, wherein the carrier (11) bears at least one continuous connection strip (25) which has a retaining rail (26) overlapping the segments (4) in their retaining area, wherewith the segments (4) are fixable in their engagement position on the carrier (11).

10. Processing machine according to claim 9, wherein the connection strip (25) is adjustable by working cylinders (27) arranged side by side over its length, especially embedded in the carrier (11) into the open and closed position.

11. Processing machine according to claim 9, wherein the holding rail (26) of the connection strip (25) is subdivided into individual comb-like rails (26a), and in that a breadth and distance between the individual rails (26a) is smaller that a width of the segments (4) oriented in the direction of movement.

12. Processing machine according to claim 11, wherein the retaining rail (26) or the individual rails (26a) have an arrangement (26b) for contacting the carrier (11) and an arrangement for contacting (26c) the respective segment (4).

13. Processing machine according to claim 8, wherein each segment (4) has at least one recess (14) as a matching coupling for the coupling projection or coupling driving unit (13) of the coupling element (9) on an upper front face in an operating position between the projection interacting with the undercuts or grooves (21, 22) of the carrier (11), a width of which approximately corresponds to that of the coupling driving unit (13) in the direction of displacement.

14. Processing machine according to claim 13, the recess (14) serving as matching coupling on a segment (4) is open to one side in the direction of displacement and bounded by a neighboring segment.

15. Processing machine according to claim 14, wherein the coupling driving unit (13) has a greater width than the recess (14) open to one side, and that an inlet slope (13a) is provided on at least one of the coupling driving unit and the recess (14).

16. Processing machine according to claim 14, wherein at least one recess (39) bounded on both sides is provided as the matching coupling on the segments (4).

17. Processing machine according to claims 1, wherein on both sides of a central slide (7) adjustable in a transverse and vertical direction at least one row of segments (4) is provided with a coupling element (9) adjustable in relation to the segments (4).

18. A processing machine for at least one of producing bent edges (1a) on plate-like sheet metal workpieces (1) and cutting and stamping of sheet metal workpieces, the processing machine comprising:

a horizontal workpiece support (5);

a processing tool;

a hold-down device (3) arranged near the processing tool, the hold-down device (3) comprising individual segments (4) for clamping the workpiece (1) on the workpiece support (5), the segments (4) being arranged in a row alongside one another in a direction of orientation of the workpiece support (5);

an adjustment drive (6) extending generally over the length of the hold-down device (3), the segments (4) being movably and fixably mounted in the direction of orientation and being selectively separably couplable with the adjustment drive;

a coupling element (9) continuously adjustable and movable in the direction of the row formed by the segments (4); and a coupling driving unit (13) adapted to couple the coupling element with the segment in any desired position of the segment (4), each segment (4) having a matching coupling for separable connection with the coupling driving unit (13) of the adjustable coupling element (9), a part of the adjustment drive (6) supporting the coupling element (9) and being arranged within a carrier (11) holding the segments (4) arranged side by side in an interior cavity (12) of the carrier, and the coupling driving unit (13) projecting out in relation to an adjacent area of a contour of the carrier (11), wherein the carrier (11) bears at least one continuous connection strip (25) which has a retaining rail (26) overlapping the segments (4) in their retaining area, wherewith the segments (4) are fixable in their engagement position on the carrier (11), and wherein in addition to the connection strip (25), a latch (30) is provided on each segment (4) for fixing its holding position on the carrier (11), the latch (30) is arranged on the segment (4) adjacent to the projection (24) lying at a distance from the connection strip (25), which engages into the undercut or groove (22) lying deeper on the carrier (11).

19. Processing machine according to claim 18, wherein a continuous longitudinal depression (32) is provided on the carrier (11) into which the latch (30) engages in a closed position.

20. A processing machine for at least one of producing bent edges (1a) on plate-like sheet metal workpieces (1) and cutting and stamping of sheet metal workpieces, the processing machine comprising:

a horizontal workpiece support (5);

a processing tool;

a hold-down device (3) arranged near the processing tool, the hold-down device (3) comprising individual segments (4) for clamping the workpiece (1) on the workpiece support (5), the segments (4) being arranged in a row alongside one another in a direction of orientation of the workpiece support (5) and a processing line;

an adjustment drive (6) extending generally over the length of the hold-down device (3), the segments (4) being movably and fixably mounted in the direction of orientation and being selectively separably couplable with the adjustment drive;

a coupling element (9) continuously adjustable and movable in the direction of the row formed by the segments (4); and a coupling driving unit (13) adapted to couple the coupling element with the segment in any desired position of the segment (4), each segment (4) having a matching coupling for separable connection with the coupling driving unit (13) of the adjustable coupling element (9), a part of the adjustment drive (6) supporting the coupling element (9) and being arranged within a carrier (11) holding the segments (4) arranged side by side in an interior cavity (12) of the carrier, and the coupling driving unit (13) projecting out in relation to an adjacent area of a contour of the carrier (11), wherein the carrier (11) which supports the segments (4) is movably mounted and fixable in a direction of its longitudinal extension and parallel to the processing line.

21. Processing machine according to claim 20, wherein the carrier (11) is mounted in a dovetail guide (40) and is fixable.

* * * * *